United States Patent
Beers et al.

(10) Patent No.: US 9,703,712 B2
(45) Date of Patent: Jul. 11, 2017

(54) SATISFYING MEMORY ORDERING REQUIREMENTS BETWEEN PARTIAL READS AND NON-SNOOP ACCESSES

(71) Applicant: Intel Corporation, Santa Clara, CA (US)

(72) Inventors: Robert H. Beers, Beaverton, OR (US); Ching-Tsun Chou, Palo Alto, CA (US); Robert J. Safranek, Portland, OR (US); James Vash, Littleton, MA (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 14/583,596

(22) Filed: Dec. 27, 2014

(65) Prior Publication Data

US 2015/0178210 A1  Jun. 25, 2015

Related U.S. Application Data

(60) Continuation of application No. 14/142,827, filed on Dec. 28, 2013, now Pat. No. 9,058,271, which is a
(Continued)

(51) Int. Cl.
*G06F 12/14* (2006.01)
*G06F 12/0831* (2016.01)
(Continued)

(52) U.S. Cl.
CPC ...... *G06F 12/0833* (2013.01); *G06F 12/0806* (2013.01); *G06F 12/0824* (2013.01);
(Continued)

(58) Field of Classification Search
CPC . G06F 12/0831; G06F 12/0833; G06F 12/121
(Continued)

(56) References Cited

U.S. PATENT DOCUMENTS 5,467,460 A  11/1995  Patel
6,065,099 A  5/2000  Clark et al.
(Continued)

FOREIGN PATENT DOCUMENTS

CN  10-1127009  2/2008
JP  2000-132531  5/2000
(Continued)

OTHER PUBLICATIONS

Summons for Oral Proceedings received on Mar. 28, 2016 for German Patent Application No. 10 2009 032 076.6-53 mailed on Mar. 17, 2016 and dated Mar. 8, 2016.
(Continued)

Primary Examiner — Jae Yu
(74) Attorney, Agent, or Firm — Patent Capital Group

(57) ABSTRACT

A method and apparatus for preserving memory ordering in a cache coherent link based interconnect in light of partial and non-coherent memory accesses is herein described. In one embodiment, partial memory accesses, such as a partial read, is implemented utilizing a Read Invalidate and/or Snoop Invalidate message. When a peer node receives a Snoop Invalidate message referencing data from a requesting node, the peer node is to invalidate a cache line associated with the data and is not to directly forward the data to the requesting node. In one embodiment, when the peer node holds the referenced cache line in a Modified coherency state, in response to receiving the Snoop Invalidate message, the peer node is to writeback the data to a home node associated with the data.

16 Claims, 7 Drawing Sheets

Related U.S. Application Data continuation of application No. 13/591,157, filed on Aug. 21, 2012, now Pat. No. 8,694,736, which is a division of application No. 12/168,613, filed on Jul. 7, 2008, now Pat. No. 8,250,311.

(51) Int. Cl.
  *H04L 29/08* (2006.01)
  *G06F 12/0817* (2016.01)
  *G06F 12/0806* (2016.01)
  *G06F 12/128* (2016.01)
  *G06F 12/0813* (2016.01)

(52) U.S. Cl.
  CPC ........ *G06F 12/0831* (2013.01); *G06F 12/128* (2013.01); *H04L 67/28* (2013.01); *H04L 67/2842* (2013.01); *G06F 12/0813* (2013.01); *G06F 2212/2542* (2013.01); *G06F 2212/62* (2013.01); *G06F 2212/621* (2013.01); *G06F 2212/69* (2013.01)

(58) Field of Classification Search
  USPC .......................................................... 711/146
  See application file for complete search history.

(56) References Cited

U.S. PATENT DOCUMENTS

| | | | |
|---|---|---|---|
| 6,922,756 B2 * | 7/2005 | Hum | G06F 12/0831 711/141 |
| 6,954,829 B2 | 10/2005 | Beers et al. | |
| 7,111,128 B2 | 9/2006 | Hum et al. | |
| 7,130,969 B2 | 10/2006 | Hum et al. | |
| 7,269,698 B2 | 9/2007 | Hum et al. | |
| 7,360,033 B2 | 4/2008 | Hum et al. | |
| 7,434,006 B2 | 10/2008 | Beers et al. | |
| 7,457,924 B2 | 11/2008 | Hum et al. | |
| 7,512,741 B1 | 3/2009 | Batson et al. | |
| 7,543,115 B1 | 6/2009 | Batson et al. | |
| 7,822,929 B2 | 10/2010 | Cen | |
| 7,917,646 B2 | 3/2011 | Hum et al. | |
| 8,171,095 B2 | 5/2012 | Hum et al. | |
| 8,250,311 B2 | 8/2012 | Beers et al. | |
| 8,255,636 B2 | 8/2012 | Batson et al. | |
| 8,694,736 B2 | 4/2014 | Beers et al. | |
| 2002/0040414 A1 | 4/2002 | Uehara et al. | |
| 2004/0008677 A1 | 1/2004 | Cen | |
| 2004/0122966 A1 | 6/2004 | Hum et al. | |
| 2004/0123045 A1 | 6/2004 | Hum et al. | |
| 2004/0123046 A1 | 6/2004 | Hum et al. | |
| 2004/0123047 A1 | 6/2004 | Hum et al. | |
| 2004/0123052 A1 | 6/2004 | Beers et al. | |
| 2005/0144400 A1 | 6/2005 | Hum et al. | |
| 2005/0204088 A1 | 9/2005 | Ho et al. | |
| 2005/0237941 A1 | 10/2005 | Beers et al. | |
| 2005/0240734 A1 | 10/2005 | Batson et al. | |
| 2005/0262250 A1 | 11/2005 | Batson et al. | |
| 2006/0236038 A1 | 10/2006 | Hum et al. | |
| 2006/0253657 A1 | 11/2006 | Hum et al. | |
| 2007/0022252 A1 | 1/2007 | Cen | |
| 2007/0022253 A1 | 1/2007 | Cypher et al. | |
| 2008/0005482 A1 | 1/2008 | Beers et al. | |
| 2008/0065835 A1 | 3/2008 | Iacobovici et al. | |
| 2008/0120441 A1 | 5/2008 | Loewenstein | |
| 2009/0198913 A1 | 8/2009 | Batson et al. | |
| 2010/0005246 A1 | 1/2010 | Beers et al. | |
| 2011/0161451 A1 | 6/2011 | Hum et al. | |
| 2012/0317369 A1 | 12/2012 | Beers et al. | |
| 2014/0115275 A1 | 4/2014 | Beers et al. | |

FOREIGN PATENT DOCUMENTS

| | | |
|---|---|---|
| JP | 2006-510119 | 3/2006 |
| WO | WO 2006/090328 | 8/2006 |

OTHER PUBLICATIONS

Summons for Oral Proceedings received on Mar. 28, 2016 for German Patent Application No. 10 2009 061 746.9 mailed on Mar. 24, 2016 and dated Mar. 8, 2016.
Hiroshige: "Hiroshige Gotoh's weekly foreign news", Citation Intel's incoming CPU interconnect "QPI", PC Watch, Mar. 31, 2008 http://pc.watch.impress.co.jp/docs/2008/0331/kaigai430.htm, pp. 2-8.
Office Action received for U.S. Appl. No. 12/168,613, mailed on Apr. 25, 2011, 8 pages.
Office Action received for U.S. Appl. No. 12/168,613, mailed on Sep. 30, 2011, 8 pages.
Notice of Allowance received for U.S. Appl. No. 12/168,613, mailed on Apr. 11, 2012, 13 pages.
Office Action received for U.S. Appl. No. 13/591,157, mailed on Jun. 6, 2013, 19 pages.
Notice of Allowance received for U.S. Appl. No. 13/591,157, mailed on Oct. 30, 2013, 11 pages.
Non-Final Office Action in U.S. Appl. No. 14/142,827 mailed on Mar. 10, 2014.
Final Office Action in U.S. Appl. No. 14/142,827 mailed on Jul. 11, 2014.
Notice of Allowance in U.S. Appl. No. Jul. 11, 2014 mailed on Oct. 24, 2014.
Notice of Allowance in U.S. Appl. No. Jul. 11, 2014 mailed on Feb. 13, 2015.
Office Action Received for Chinese Patent Application No. 200910158744.5, mailed on Apr. 20, 2011, 3 pages of Office Action and 2 pages of English translation.
Office Action received for Chinese Patent Application No. 200910158744.5, mailed on Mar. 29, 2012, 7 pages of Office Action including 3 pages of English Translation.
Office Action received for Chinese Patent Application No. 200910158744.5, mailed on Oct. 22, 2012, 9 pages of Office Action including 5 pages of English Translation.
Notice of Allowance received for Chinese Patent Application No. 200910158744.5, mailed on Apr. 12, 2013, 2 pages of Notice of Allowance including 4 pages of English Translation.
Office Action Received for German Patent Application No. 10 2009 032 076.6-53 mailed on Jul. 14, 2010, 6 pages of Office Action including English Translation.
Office Action Received for Japanese Patent Application No. 2009-159799, mailed on Jan. 4, 2012, 3 pages of Office Action and 3 pages of English translation.

* cited by examiner

SATISFYING MEMORY ORDERING REQUIREMENTS BETWEEN PARTIAL READS AND NON-SNOOP ACCESSES

RELATED APPLICATION

This Application is a continuation (and claims the benefit of priority under 35 U.S.C. §120) of U.S. patent application Ser. No. 14/142,827, filed Dec. 28, 2013 and entitled SATISFYING MEMORY ORDERING REQUIREMENTS BETWEEN PARTIAL READS AND NON-SNOOP ACCESSES, which application is a continuation of U.S. patent application Ser. No. 13/591,157, filed on Aug. 21, 2012, now issued as U.S. Pat. No. 8,694,736, which application is a divisional of U.S. patent application Ser. No. 12/168,613, filed on Jul. 7, 2008 now issued as U.S. Pat. No. 8,250,311. The disclosures of the prior applications are considered part of and are hereby incorporated by reference in their entirety in the disclosure of this application.

FIELD

This invention relates to high speed point to point interconnect links, and in particular, to coherence protocols for implementing a coherent interconnect architecture.

BACKGROUND

When an electronic system includes multiple cache memories, the validity, or coherence, of the data held in the system is maintained to ensure integrity of data operations. Coherency is often accomplished by manipulating data according to a cache coherency protocol. As the number of caches and/or processors increases, the complexity of maintaining coherency increases, which potentially results in a greater number of conflicts between the multiple components of a system.

For example, when multiple components (e.g., a cache memory, a processor) request the same block of data, a conflict between the multiple components is resolved in a manner that maintains validity of the data. Previous cache coherency protocols typically have a single component that is responsible for conflict resolution. However, as the complexity of the system increases, reliance on a single component for conflict resolution can decrease overall system performance.

Generally, there are two basic schemes for providing cache coherence: snooping (now often called Symmetric MultiProcessing SMP) and directories (often called Distributed Shared Memory DSM). The fundamental difference between these two schemes revolves around the placement and access to meta-information; that is, the information about where copies of a cache line are held.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node, in a directory system, is referred to as a home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides. SCI, for example, uses this scheme, with each node that contains a cached copy maintaining links to other nodes with cached copies, thus collectively maintaining a complete directory.

For snooping caches, the meta-information is distributed with the cached copies themselves, such that each valid copy of a cache line is held by a unit, which is to recognize requests to access the cache line and respond accordingly. Typically, there is a repository where the data is held in an un-cached state, i.e. its original location. Often, an agent or unit responsible for this original location is referred to as a home node. When requesting access to a cache line, a requesting node often broadcasts the address of a requested cache line, along with permissions needed, and nodes holding a copy of the requested cache line respond accordingly.

However, in some of the current coherence and messaging protocols partial reads of cache lines and non-snoop memory accesses, i.e. noncoherent accesses in a coherent architecture, under certain circumstances potentially result in forwarding of invalid data to a requestor. Often these circumstances arise from violations of memory ordering rules within a protocol. As a result, illegal operation may be performed by agents receiving the invalid data, which potentially leads to instability within a system.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific interconnect architectures, specific messages, specific pseudo code, specific interconnect architecture layers, etc. in order to provide a thorough understanding of the present invention. It will be apparent, however, to one skilled in the art that these specific details need not be employed to practice the present invention. In other instances, well known components or methods, such as specific interconnect layer architectural details, specific non-relevant messages and protocols, specific operational details of processors and caches, etc. have not been described in detail in order to avoid unnecessarily obscuring the present invention.

The method and apparatus described herein are for providing proper memory ordering between partial accesses and non-snoop memory accesses in an interconnect architecture. Specifically, adherence to memory ordering requirements is primarily discussed in reference to an illustrative cache-coherent link based interconnect architecture. However, the methods and apparatus for providing proper memory ordering requirements are not so limited, as they may be implemented with any interconnect architecture.

Embodiment of an Illustrative Interconnect Architecture

Figure 1:
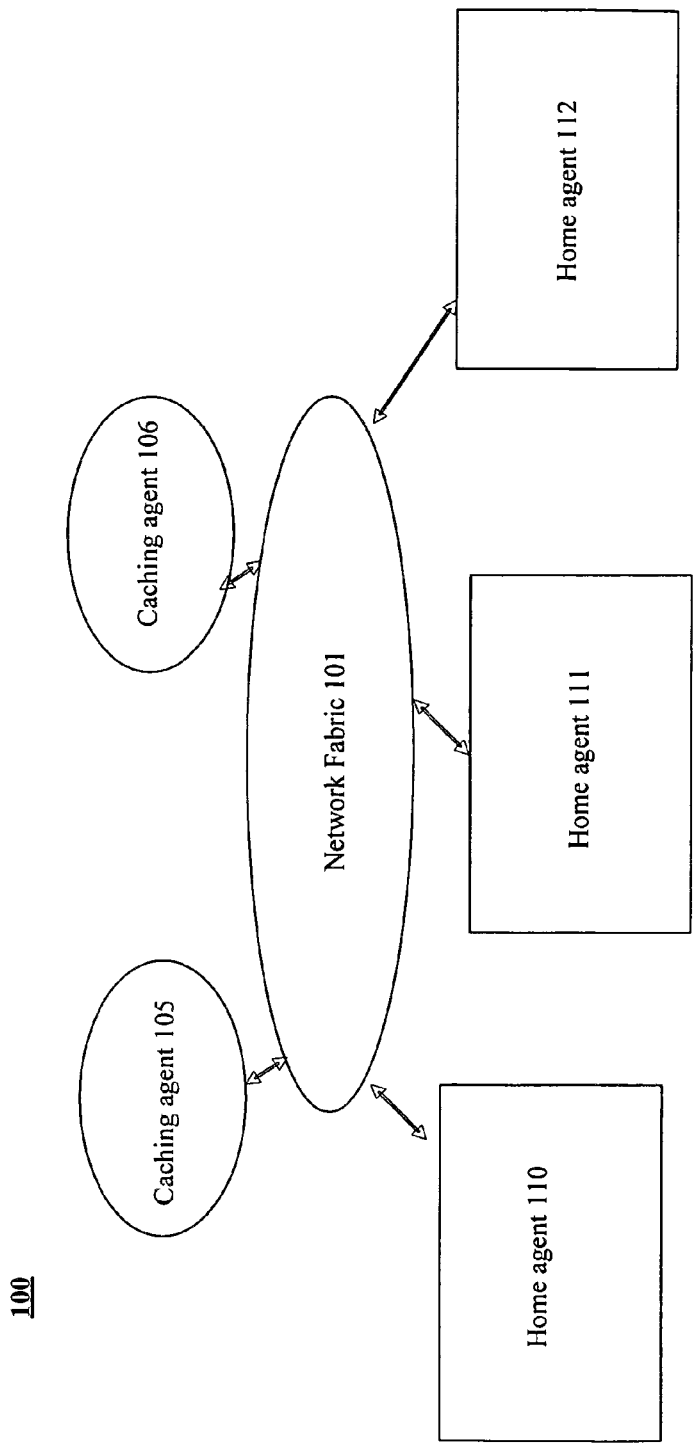
FIG. 1 illustrates an embodiment of a protocol architecture.

FIG. 1 illustrates an embodiment of a high-level simplified protocol architecture. In one embodiment, the protocol architecture is to maintain data consistency between data in caches within the architecture during normal transactions, as well as during conflicting requests. In addition, the protocol architecture, in one embodiment, also provides forward progress for each request, such that each request is satisfied and retired.

A protocol architecture may include any number of nodes or agents. In one embodiment, a node includes a processor that is associated with an internal cache memory, an external cache memory, and/or an external memory. However, a node or agent may refer to any device, or collection thereof, in an interconnect architecture, such as a processor, a memory controller hub, and I/O hub, a generic controller hub, I/O device, a collection of I/O devices, or any other device/component capable of accessing memory. In another embodiment, a node is an electronic system (e.g., computer system, mobile device) interconnected with other electronic systems. Other types of node configurations may also be used.

As illustrated, architecture 100 includes caching nodes/agents 105-106 and home agents 110-112. In one embodiment, home agents 110-112 are to guard memory locations, which are final repositories of a coherent memory space. In other words, agent 110 is a home agent responsible for a plurality of original physical memory locations for data of a coherent memory space. Home agents 110-112 may perform any combination of the following tasks including: tracking cache state transitions from caching agents 105-106, managing conflicts amongst caching agents 105-106, interfacing to memory, providing data and/or ownership, as well as any other known home agent related tasks.

In one embodiment, caching agents 105-106 include agents that are associated with cache memories, such as processors including cache memories and caching I/O proxy entities. Cache agents 105-106 may perform any combination of the following tasks, as well as any other tasks, such as performing read and write requests into coherent memory space, holding cached copies of data from coherent memory space, and supplying cached copies to other peer caching agents. A caching agent or node may also be referred to as a peer agent/node in relation to another caching agent. Although not illustrated specifically in FIG. 1, the protocol architecture may also include non-caching agents, such as an Input/Output (I/O) Hub to participate or witness transactions on behalf of I/O devices.

In one embodiment, caching agents 105-106 and home agents 110-112 maintain data consistency and provide forward progress through exchanging messages over network fabric 101. In one embodiment, fabric 101 facilitates transporting of messages from one agent/node to another agent/node through a point-to-point interconnect network. It is often said that FIG. 1 depicts a cache coherence protocol's abstract view of an underlying network.

In one embodiment, interconnect architecture 100 may incorporate any combination of novel features, as described in the following co-pending applications. For example, U.S. Pat. No. 6,922,756 and entitled "Forward State for Use in Cache Coherency in a Multi-Node System," describes utilization of a Forward cache coherency state (F-state). Furthermore, examples of coherence protocols in various situations are discussed in U.S. patent application Ser. No. 10/833,963, filed on Apr. 27, 2004, now issued as U.S. Pat. No. 7,822,929, and entitled "A Two-Hop Cache Coherency Protocol;" U.S. patent application Ser. No. 10/833,965, filed on Apr. 27, 2004, and entitled "A Messaging Protocol;" U.S. patent application Ser. No. 10/833,977, filed on Apr. 27, 2004, and entitled, "A Cache Coherence Protocol;" U.S. patent application Ser. No. 11/330,977 filed on Jan. 11, 2006, and entitled, "A Two-Hop Source Snoop Based Cache Coherence Protocol;" and U.S. patent application Ser. No. 11/331,301, filed on Jan. 11, 2006, and entitled, "A Two-Hop Source Snoop Based Messaging Protocol."

Other examples include, U.S. patent application Ser. No. 10/325,427 filed on Dec. 19, 2002, now issued as U.S. Pat. No. 7,917,646, and entitled "Speculative Distributed Conflict Resolution for a Cache Coherency Protocol;" U.S. patent application Ser. No. 10/326,234 filed on Dec. 19, 2002, now issued as U.S. Pat. No. 7,130,969, and entitled "Hierarchical Directories for Cache Coherency in a Multi-processor System;" U.S. patent application Ser. No. 10/324,711, now issued as U.S. Pat. No. 7,111,128, and entitled "Hierarchical Virtual Model of a Cache Hierarchy in a Multiprocessor System;" and U.S. patent application Ser. No. 10/326,232, filed on Dec. 19, 2002 now issued as U.S. Pat. No. 6,954,829, and entitled "Non-Speculative Distributed Conflict Resolution for a Cache Coherency Protocol."

Note that the features described in the aforementioned co-pending applications may be incorporated in the embodiments described herein; however, the embodiments described herein are not so limited as they may include additional features, as well as potentially none of the features described above.

Figure 2:
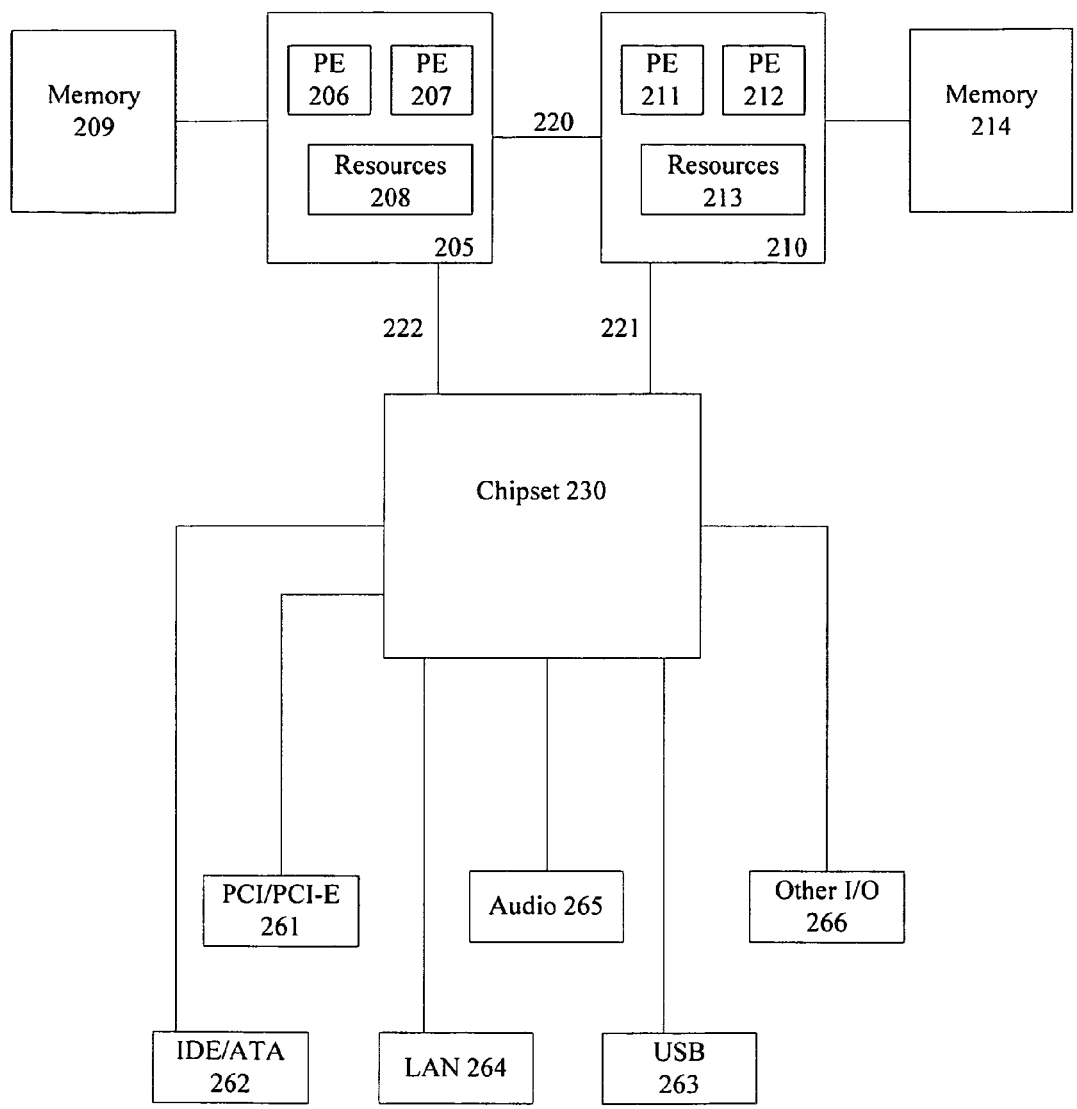
FIG. 2 illustrates an embodiment of a system including multiple processors coupled to a chipset utilizing a point-to-point interconnect.

FIG. 2 illustrates an embodiment of a system including multiple processors coupled to a chipset utilizing a point-to-point interconnect architecture. The system of FIG. 2 may also include several processors, of which only two, processors 205, 210 are shown for clarity. As illustrated, processors 205, 210 each include two processing elements 206-207, 211-212; although, any number of processing elements may be included in processors 205, 210.

A processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. As an example, a physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread, which may also be referred to as a physical thread, typically refers to any logic located on an integrated circuit capable of maintaining an independent architectural state, wherein the independently maintained architectural states share access to execution resources. Therefore, as can be seen, multiple software threads, such as multiple replications of a single-threaded application, in one embodiment, are capable of being executed in parallel on multiple processing elements, which may include a combination of any of the aforementioned processing elements, such as cores or hardware threads.

Also illustrated in processors 205, 210 are resources 208, 213, which typically include registers, units, logic, firmware, memory, and other resources to execute code or interface with other devices. As stated above, some of resources 110 may be partially or fully dedicated to processing elements, while others are shared among processing elements. For example, smaller resources, such as instruction pointers and renaming logic may be replicated for physical threads. Some resources, such as re-order buffers in a reorder/retirement unit, instruction lookaside translation buffer (ILTB), load/store buffers, and queues may be shared through partitioning. Other resources, such as general purpose internal registers, page-table base registers, low-level data-cache, a data-TLB, execution unit(s), and an out-of-order unit are potentially fully shared among threads. In contrast, cores may have dedicated execution resources, while sharing at least a portion of a higher level cache, such as a second level cache (L2).

In one embodiment, resources 208, 213 include a processor pipeline, which may include any number of pipeline stages. Common examples of pipeline stages include an instruction pointer stage, a fetch stage, a decode stage, a drive stages, and allocate stage, a renaming stage, a queue stage, a reorder stage, a schedule stage, a dispatch stage, an execution stage, a memory access stage, and a register access stage. Note this list of stages includes an exemplary non-exhaustive list of processor pipeline stages, as any known pipeline stages may be included in processor 100.

Processors 205, 210 may each also include a memory controller or a local memory controller hub (MCH) to interface with memory 209, 214, accordingly. Memories 209, 214 include any memory device, such as a Random Access Memory (RAM), cache memory, flash memory, or other memory device. In one embodiment, memory 214 includes a higher-level cache memory, while resources 213 includes a low-level cache memory. In another embodiment, memory 209 includes a Dynamic Random Access Memory (DRAM) associated with processor 205, which includes a cache memory to cache data from DRAM 209. Note this is an illustrative embodiment, as memories 209,214 potentially include any style memory device.

In one embodiment, where memories 209,214 include cache memories either included within processors 205,210, or external thereto as illustrated, processors 205,210 are capable of being a home node as well as a peer caching node. For example, when a transaction references a memory location within memory 209, the agent responsible for memory 209, i.e. processor 205, is determined to be a home agent in relation to the transaction and the memory location. Similarly, with a transaction referencing another memory location, such as a location in memory 214, processor 205 is determined to be a peer-caching agent.

As can be seen, point-to-point links 220-224 couple components together in a point-to-point fashion. Physical links 220-224, in one embodiment, each include a bidirectional differential signaling interconnect, such as the physical links associated with a physical layer discussed below in reference to FIG. 3. As a result, processors 205,210 and chipset 230 are capable of direct communication with each other.

Chipset 230 is often a generic reference to multiple integrated circuits, such as a memory controller hub coupled to an input/output (I/O) hub. However, in one embodiment, where agents each include a version of a memory controller hub to interface with memory, chipset 230 refers to an I/O hub or other controller hub. In one embodiment, chipset 230, as discussed above, is a non-caching agent to participate or witness transactions. However, chipset 230 is not so limited, as in other embodiments, chipset 230 is a caching agent including a cache memory and/or a home agent including a memory having original memory location repositories for data.

As illustrated, chipset 230 is also to interface with a plurality of interconnect and I/O devices, such as Peripheral Component Interconnect (PCI) or PCI Express (PCI-E) device 261, Integrated Device Electronics (IDE) or Advanced Transfer Attachment (ATA) device 262, Universal Serial Bus (USB) device 263, Local Area Network (LAN) or Wireless LAN (WLAN) device 264, Audio device 265, and Other I/O device 266, which may also include another interconnect architecture for coupling I/O devices as described herein.

Figure 3:
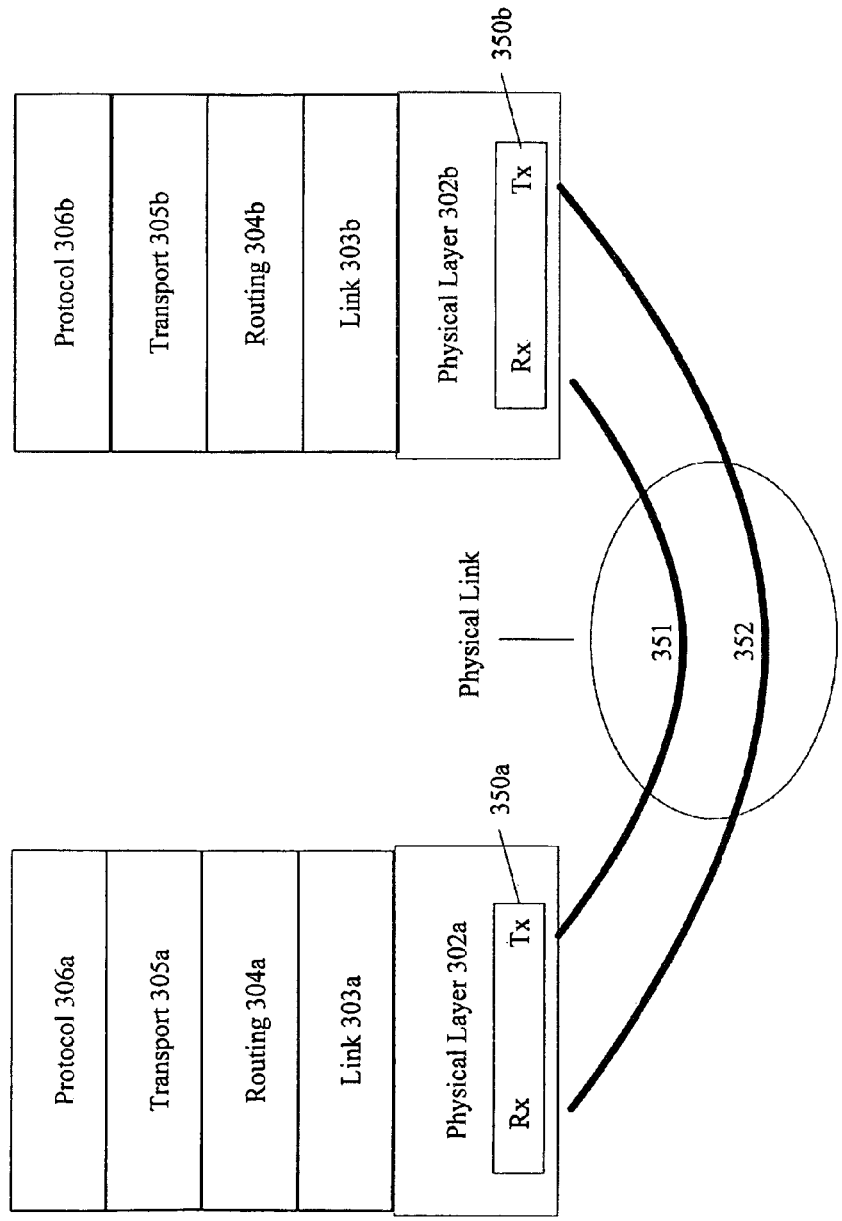
FIG. 3 illustrates an embodiment of a block diagram for a bidirectional interconnect architecture utilizing a layered input/output (I/O) stack.

Referring to FIG. 3, an embodiment of a block diagram for a bidirectional interconnect architecture utilizing a layered interconnect stack is illustrated. Reference to layers of FIG. 3, such as a physical layer 302, includes discussion of a generic layer, which may be implemented in different agents, such as physical layer 302*a* and physical layer 302*b*. As depicted, the interconnect stack is partitioned into five layers, one or more of which are potentially optional based on a design implementation. For example, routing layer 304, in one embodiment, is embedded in the functionality of link layer 303; hence, routing layer, in one embodiment, is not a separate and distinct layer.

In one embodiment, physical layer 302 is responsible for electrical transfer of information on a physical medium. For example, a physical point-to-point link is utilized between link layer entities 303*a* and 303*b*. As an illustrative example, the physical link includes a differential signaling scheme, which includes a bidirectional differential signaling pair 351 and 352. Here, the physical layer is potentially logically divided into an electrical sub-block and a logical sub block, such that the physical layer is to isolate the rest of the stack from the electrical transfer of information and is to communicate with link layer 303.

In one embodiment, link layer 303 abstracts physical layer 302 from upper layers of the stack and provides link related services, such as reliable data transfer and flow control between connected agents/entities and virtualization of a physical channel/interface into multiple virtual channels and message classes. Here, virtual channels may be viewed as multiple virtual networks for use by upper layers of the stack. For example, protocol layer 306 potentially relies on the abstraction provided by link layer 303 to map a protocol message into a message class and, therefore, to one or more virtual channels.

Routing layer 304, in one embodiment, provides a flexible method for routing packets from a source to a destination. As stated above, in extremely simple topologies, routing layer 304 may not be explicit, but rather integrated into the functionality of link layer 303. For example, routing layer 304 may rely on the abstraction of link layer 303 to specify a <port, virtual network> pair to route a packet. Here, routing table information is held to provide routing information for packets.

In one embodiment, transport layer 305 provides end-to-end reliable transmission services. Similar to routing layer 304, transport layer 305 is also optional based on design implementation. As an example, transport layer 305 relies on routing layer 304 services to provide reliable transmission support for protocol layer 306. Within an interconnect architecture, in one embodiment, a subset of components include transport layer 305. As a result, this subset of components define sub-fields of packets relating to transport layer 305, while other components potentially do not define those sub-fields.

Protocol layer 306, in one embodiment, is to implement a higher-level communication protocol between nodes/agents, such as cache coherence, ordering, peer-to-peer communication, interrupt deliver, etc. In other words, protocol layer 306 defines permissible messages, requests, responses, phases, coherence states, etc. for nodes or agents, such as home nodes, peer nodes, caching nodes, and non-caching nodes, accordingly. Examples of messages, such as home node messages, snoop messages, response messages, etc. are discussed below.

Note that discussion of layers, and logic associated therewith, may be coupled in any manner. For example, it may be said that protocol logic is coupled to physical layer, i.e. transmission or receiving logic. Here, as can be seen from FIG. 3, in one embodiment, protocol logic may not be directly coupled to physical layer logic, but rather coupled through other layer logic. Furthermore, the interconnect stack, in one embodiment, is coupled to inner component logic, such as cache control or cache memory logic, to initiate appropriate cache coherence actions.

Overview of an Embodiment of a MESIF Protocol

In one embodiment, the basic Modified Exclusive Shared Invalid Forward (MESIF) protocol provides a protocol similar to a snoop protocol without the potential limitations of a single, serializing bus. Like a snooping cache protocol, MESIF relies on nodes with cached copies of data to maintain coherence. The use of point-to-point links rather than a synchronous, centralized broadcast introduces the problem of time-warp, i.e. the fact that events appear to occur in a different order from the viewpoint of different nodes. As an example, the MESIF protocol handles time-warp through recognition of potential errors due to time-warp, and providing protocol or software solution thereto.

A home node is often associated with an uncached copy of data. As a result, a home node may participate in a transaction relating to data associated with the home node. However, the home node does not have to be included in a "critical path" associated with a transaction, but rather a home node may interject in the transaction to resolve conflicts and time-warp issues. Because of the concurrent-broadcast nature of the scheme, in one embodiment, MESIF achieves the low latency associated with snooping protocols, while acquiring a cacheable copy of the data, in certain cases, in the minimum possible latency: a single roundtrip request-response.

In one embodiment, a basic transaction related to a MESIF protocol involves broadcasting an initial request to all peer nodes as well as a home node. If a copy is cached in state E, F, or M coherency state, it is included in the response. A second message is then sent to the home node, informing it that the request has been satisfied. If the requested line is uncached, or if only S-state copies exist, the second request sent to the home node is used to confirm the previous request, which the home node may have, by now, fetched from its memory. In either case, the home node responds to the second request (and potentially to the first, though they can sometimes be combined) for purposes of synchronization and conflict resolution. Note that the home node may have one or more caches, so it may respond to the initial request just like any other node.

In one embodiment, conflicts are handled in a distributed way. The time-warp problem makes it difficult to detect conflicts, because individual requests can be delayed for an arbitrarily long time. A conflict will be detected, however, if each node monitors for conflicts after making a request. Multiple nodes may potentially detect a conflict, but as an example, at least one of the nodes will detect a conflict. As a result, a response from a node, in one embodiment, potentially includes conflict information.

In one embodiment, a node receiving a copy of the data from a response is allowed to use the data internally immediately upon receipt, but does not make the effects of using the data visible to the rest of the system, i.e. globally visible, until the node has received a confirmation. The confirmation may also include instructions that the requesting node must forward its copy to another node, and perhaps evict the node from its own cache.

Finally, when a node responds to a request from another node by supplying the cached data, the node, in one embodiment, defers other requests it receives for the same cache line until the node receives a response from the Home node acknowledging the fact that the node forwarded the data, thus assuring that all nodes observe the same order of transfer of the (possibly writable) cache line.

The home node, as stated above, is a repository for uncached data, but the home node also may include processor and a cache. Here, when the home node processor misses the cache, the home node broadcasts requests to all other (peer) nodes, and the home node handles the request internally as it would any other request arriving for the home node. Note that this is a special case, in that the home node does not explicitly send messages to itself (the Home node). In addition, when an external request arrives for data that is cached locally, the home node responds appropriately.

The disclosed message protocol defines a set of allowed messages between coherence (cache and home) agents, non caching agents, as well as other agents (memory controllers, processors, etc). A coherence protocol uses the messages as words and grammar in an algorithm to express a coherent thought. This algorithm sensibly orders requests, resolves conflicts, and describes interactions between caching agents. Although, a MESIF protocol is described above, the MESIF cache coherence protocol is not required to be utilized. For example, the Forward state may not be utilized, which results in utilization of the known MESI protocol. Furthermore, note the discussion above includes an exemplary overview of an embodiment for a MESIF protocol. Consequently, various components described above may differ in separate embodiments. A non-exhaustive exemplary list of potential messages utilized in a messaging and/or coherence protocol are included below.

Snoop Messages

In one embodiment, snoop messages are directed towards caching agents, such as peer caching agents. Snoop messages typically do not include a home node identifier (ID), such that they are routed to peer caching agents, but not to a home node.

Snoop Data (SnpData): This is a snoop to get data in E, F, or S states.

Snoop Invalidate Own (SnpInvOwn): This is a snoop to get data in E or M states. In one embodiment, a peer agent is to provide the data in response to holding the data in its local memory in the E or M state.

Snoop Invalidate Invalid to Exclusive (SnpInvItoE): This is a snoop to invalidate a peer caching agent and to flush any M state data to the home node.

Snoop Invalidate X to Invalid (SnpInvXtoI): This is a snoop to invalidate a peer caching agent and to flush any M state data to the home node.

Snoop Invalidate No Forward (SnpInvNoFwd): This is a snoop to get data causing a peer agent to (1) write back the data to memory held in certain cache coherency states, (2) invalidate the data held in local memory, and (3) not provide the data directly to the requesting node. In one embodiment, a peer agent is to writeback the data held in an M state. In other embodiments, a peer agent is also to writeback the data held in an E state, S state, F state, or combination thereof.

Home Messages

The following messages are associated with a home node. As an example, some of the following are request messages to a home node. In fact, note the similarity between some of the snoop messages and home messages. For example, SnpInvNoFwd from above and RdInvNoFwd from below are similar, except for the snoop message is directed towards peer caching agents and the read message is directed towards a home agent. As a result, it is often said that both the SnpInvNoFwd and the RdInvNoFwd are of the same message type, such as a Read Invalidate Type, a Snoop Invalidate Type, a Read Invalidate No Forward Type, and the Snoop Invalidate No Forward Type.

Other home messages include home write back marker messages. Here, data may be sent separate via WbData messages, which may be received in any order in regards to the marker messages. Other examples of home messages included below are home snoop response messages from caching agents to home agents and home acknowledgement of conflict messages to signal a beginning of a conflict phase.

Read Data (RdData): This is a request for data in an Exclusive (E) state, as well as potentially a Forward (F) state or an S state depending on the embodiment.

Read Invalidate Own (RdInvOwn): This is a request for a cache line in M or E states.

Invalidate Invalid to Exclusive (InvItoE): This is a request for a cache line without data.

Non-Snoop Read (NonSnpRd): This is a request to perform a noncoherent read from memory.

Non-Snoop Write (NonSnpW): This is a request to perform a noncoherent write to memory.

Read Invalidate No Forward (RdInvNoFwd): This is a request to read data from memory. In one embodiment, a home node is to wait for data to be written back from a caching agent in response to receiving this message and is then to provide correct data to the requesting agent after receiving the data that was written back. In another embodiment, the home node is to receive a response message from a peer caching agent that a referenced line is held in an Invalid state. Here, the home node is to provide the correct data from its local memory or the original memory repository.

Note, as discussed above, a RdInvNoFwd is similar to a SnpInvNoFwd message; however, often with a snoop message, a home node identifier (ID) is not included in the message, such that a snoop is not routed to the home node, while a RdInvNoFwd is routed to a home node.

WriteBack Modified to Invalid, Shared, or Exclusive (WbMtoI, WbMtoS, and WbMtoE): This is a request to write a cache line in an M state back to memory and transition the cache line state to an Invalid state, a Shared state, or an Exclusive state, accordingly. In one embodiment, these messages are marker messages to indicate data is to be sent, while the data is actually carried via a separate message, such as a WB*Data* message.

Response Invalid or Shared (RspI or RspS): Peer Agent is left with line in Invalid State or in an S state, accordingly.

Response Forward Invalid or Shared (RspFwdI or RspFwdS): Peer has sent data to the requester and the line is left in an Invalid or Shared State, accordingly.

Response Forward Invalid or Shared Writeback (RspFwdIWb or RspFwdSWb): Peer has sent data to the requestor and a WbIData to a home node, and the line is left in the Invalid or Shared state, accordingly Response Invalid or Shared Writeback (RspIWb or RspSWb): Peer has evicted the data with an in-flight WbIData message to the home, and has not sent any message to the requestor.

Response Conflict (RspCnflt): Peer is left with line in Invalid state and the peer has a conflicting outstanding request.

Acknowledge Conflict (AckCnflt): Acknowledge receipt of a data completion/grant and completion/force acknowledge conflict.

Non-Data Response Messages

In one embodiment, non-data response messages include grant messages to grant ownership for a line without sending data. Non-data response messages may also include completion messages to signal completion and potentially extract data from an owner under conflict conditions.

Grant_Completion (GntCmp): Grant Exclusive ownership without data

Grant Force Acknowledge Conflict (Gnt_FrcAckCnflt): Grant Exclusive ownership without data plus a force acknowledge conflict.

Completion (CMP): all snoop responses gathered and no conflict detected.

Force Acknowledge Conflict (FrcAckCnflt): snoop responses gathered, for an acknowledge conflict.

Complete Forward Invalidate Own (Cmp FwdInvOwn): Complete request, forward the line in Exclusive or Modified State to the requestor, and invalidate local copy.

Data Response Messages

DataC_*: Data in corresponding MESIF state.

DataC_*_Cmp: Data in corresponding ESIF state with a completion.

DataC_*_FrcAckCnflt: Data in corresponding ESIF state with a FrcAckCnflt.

Wb*Data: Writeback data, transition to corresponding E, S, or I state.

Non-Snoop Write Data (NonSnpWr): This is a noncoherent write to memory.

Figure 4A:
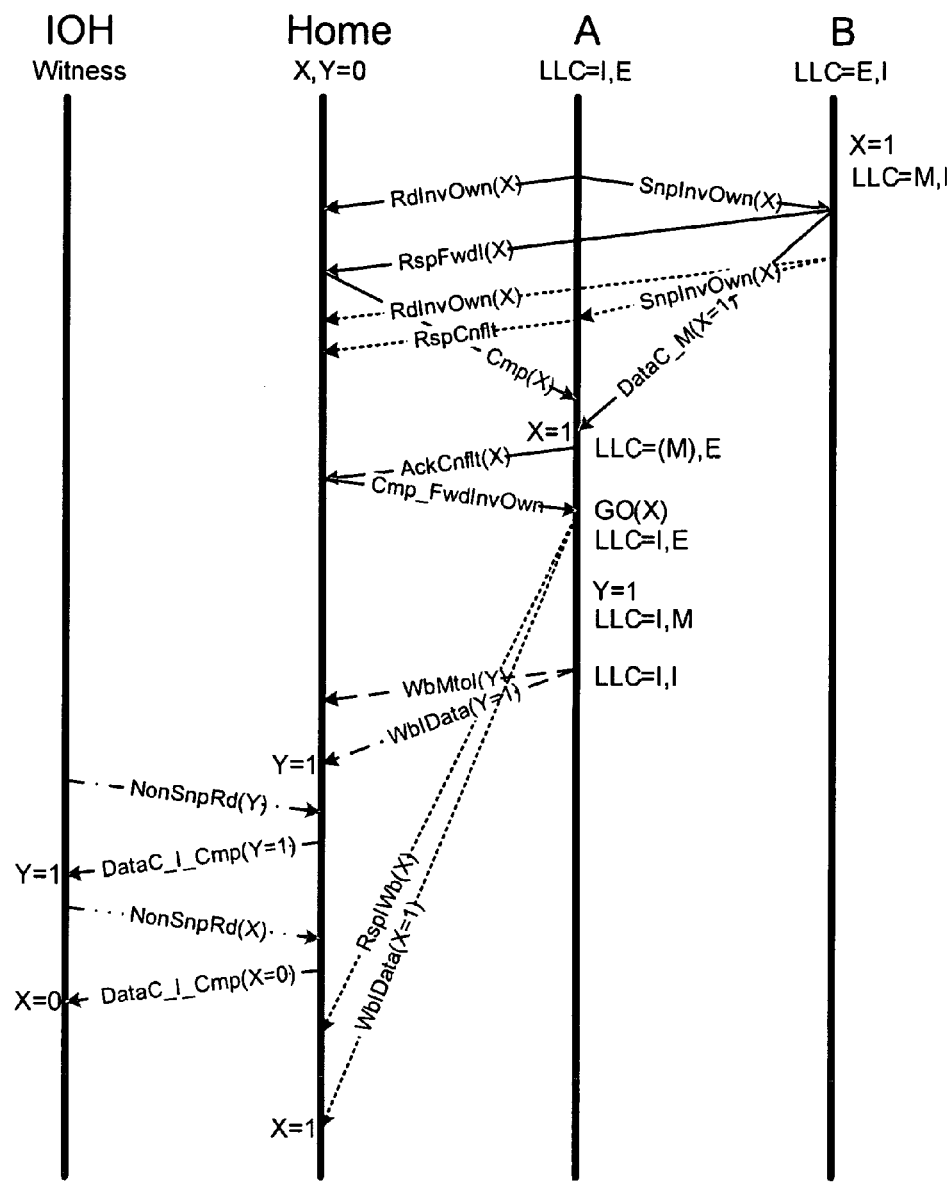
FIG. 4a illustrates an embodiment of a protocol diagram for a messaging protocol between multiple nodes that potentially results in an access to invalid data.

Turning to FIG. 4a, an embodiment of a protocol diagram for messaging between multiple nodes is illustrated. Four nodes, or agents, are illustrated: an I/O hub, a home node, a processor A with a cache, and a processor B with a cache. Note, as depicted, processor's A,B include peer caching agents, while the I/O hub is a non-caching agent, i.e. a witness.

The protocol illustrated in FIG. 4a is in response to the following oversimplified interaction pattern:

Processor B: X=1 //B writes to data X

Processor A: If(X==1) Y=1 //A performs partial Rd of X & writes to Y

IOH: If(Y==1) assert (X==1) //IOH performs a non-snoop RD of Y and X

Here, note that, in one embodiment, the interconnect architecture supports partial memory accesses and non-snoop memory accesses. As an example, a partial memory access, which may also be referred to as an un-cacheable (UC) memory access, includes an access to a portion of a cache line. Here, some of the cache line potentially includes invalid data, so a portion is either updated or read, according to the memory access. In addition, a non-snoop memory access refers to a non-coherent memory access from a non-caching agent, such as the I/O Hub.

In specific reference to FIG. 4a, processor B performs the write to data X, i.e. X=1. In response to the partial read of data X from processor A, a RdInvOwn(X) message is transmitted to the home node and a SnpInvOwn(X) message is transmitted to peer agent B. Since B currently holds the cache line associated with data X in a modified state, in response to receiving the SnpInvOwn(X), agent B provides the data X in a DataC_M(X=1) message to requesting agent A and transmits a RspFwdI(X) message to the home node to indicate that it has provided the data to requesting agent A and has left the cache line in the Invalid state, i.e. LLC=M,I. Here, the home node transmits a completion(X) message to processor A to indicate a completion of the transaction.

However, after agent B transmits the data to requesting agent A, but before agent A receives the completion message, agent B issues a request message, i.e. SnpInvOwn(X), requesting data X, which is illustrated as a separate transaction with dotted lines. As a result, agent A detects a conflict regarding data X. Consequently, agent A transmits a RspCnflt to the home node and later an AckCnflt(X) in response to receiving data/the completion.

Consequently, the home node, as the arbitrator of conflicts, transmits to agent A Cmp_FwdInvOwn to agent A. In response, agent A writes X=1 back to the home node with message marker RspIWb(X) and data message WbIData (X=1) and agent A performs the cacheable write to Y, i.e. Y=1. Here, Y=1 is written back to the home agent with marker WbMtoI(Y) and data message WbIData(Y=1).

However, the writeback messages from agent A to provide the value of X as 1 are delayed due to any number of reasons. In the meantime, non-caching agent I/O Hub performs the non-snoop read of Y, i.e. NonSnpRd(Y), and the non-snoop read of X, i.e. NonSnpRd(X). As can be seen from the illustration, in the DataC_I_Cmp(X=0) message, which is in response to the NonSnpRd(X), X has a value of 0, instead of 1, due to the delay of the writeback messages from agent A to the home node. Essentially, an invalid value of 0 is provided to the I/O hub instead of the valid value of 1, which is a result of the earlier partial read being involved in a conflict and a non-snoop read being performed by a non-caching agent before the correct data is received at the home node.

Here, the potential problems may be summarized as the Read Invalidate Own message potentially causes a peer agent (B) to forward a modified copy to the partial read requestor (A) without a write back to memory, and by the time A reaches global observation and provides the correct value of X back to the home node, the home node has already potentially provided an incorrect value to the I/O hub.

Therefore, in one embodiment, a specific message type is utilized for partial memory accesses, such as a partial read. In one embodiment, the message type includes a snoop invalidate message directed at a peer agent to indicate an associated cache line should be invalidated and not forwarded to the partial read requestor. Furthermore, in another embodiment, the message is also to indicate to the peer agent that data in a specific cache coherency state, such as a modified state, should be written back memory, i.e. the home node.

Similarly, the specific message type, in one embodiment, includes a read invalidate message directed at a home node, instead of a snoop invalidate message directed at a peer agent. In one embodiment, a home node is to provide the correct data to the partial read requestor in response to receiving the read invalidate message. Here, providing the correct data potentially includes waiting for a cache agent that received the snoop message to write-back its copy of the data held in the specific cache coherency state, such as a Modified state, and providing that copy to the partial read requestor. In another embodiment, providing the correct data potentially includes receiving a response from a peer agent that it holds the cache line in an invalid state, and providing a local copy of the data in the home node or a copy of the data from an original repository associated with the home node to the partial read requestor.

As a first example, the message type includes a Read Invalidate No Forward (RdInvNoFwd) message, where the snoop invalidate message to the peer agent includes a Snoop Invalidate No Forward (SnpInvNoFwd) message and the Read Invalidate message to the home node includes a Read Invalidate No Forward message. However, the message type and messages are not so limited. In fact, in another embodiment, another snoop invalidate message, such as SnpInvItoE or SnpInvXtoI is used. Here, as discussed above, the snoop is invalidating and indicative through the message itself, or through implementation of the generic protocol, that data is not to be directly forwarded from the receiving agent to the partial read requesting agent.

Figure 4B:
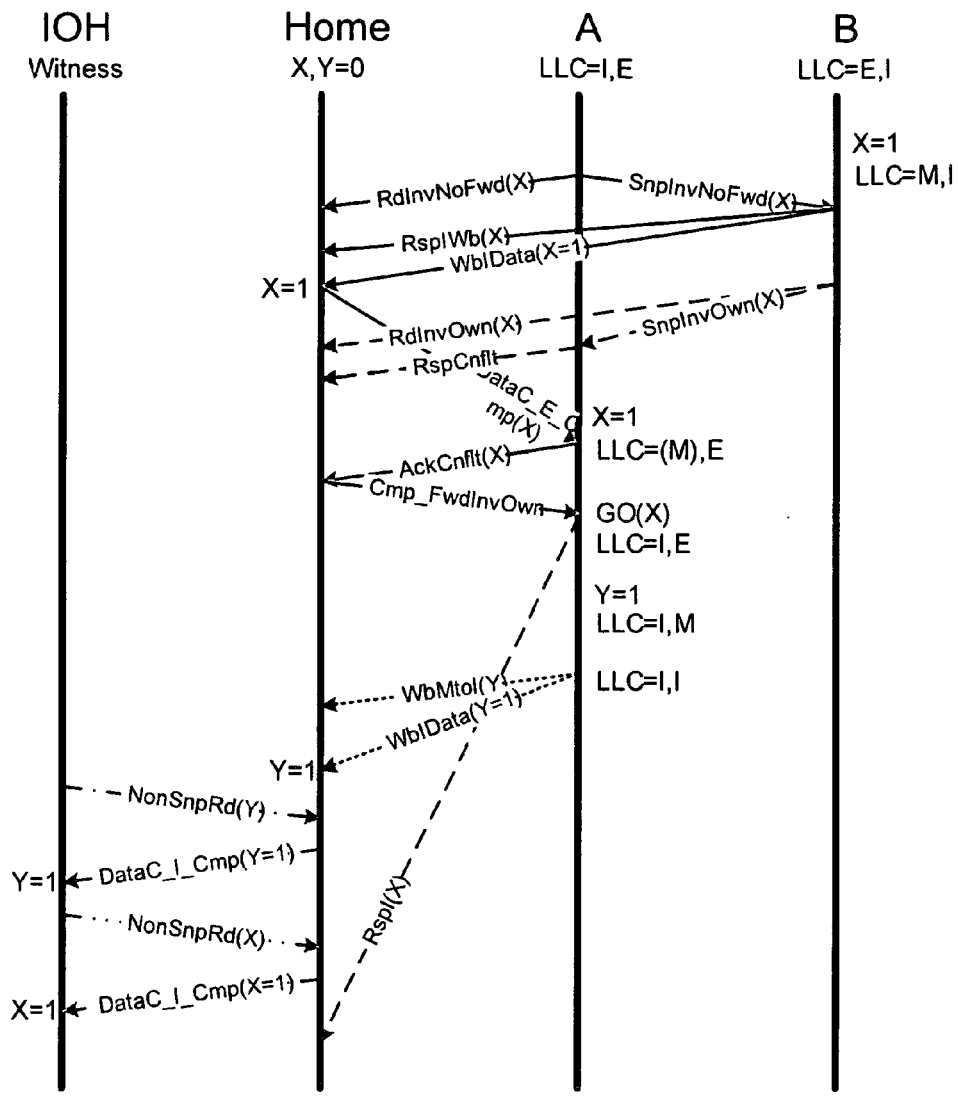
FIG. 4b illustrates an embodiment of a protocol diagram for providing valid data in response to partial and non-snoop memory accesses.

FIG. 4b illustrates an embodiment of a protocol diagram for providing valid data in response to partial and non-snoop memory accesses. Similar to the diagram of FIG. 4a, the same agents are involved in the aforementioned interaction pattern. However, here, instead of transmitting a RdInvOwn(X) message to the home node and a SnpInvOwn(X) message to peer agent B in response to the partial read request by agent A, a RdInvNoFwd(X) message is transmitted to the home node and a SnpInvNoFwd(X) message is transmitted to peer agent B in response to the partial read request.

Here, when peer agent B receives the SnpInvOwn(X) message, the cache line associated with the data is held in a Modified cache coherency state. Therefore, the modified copy of the data, i.e. X=1, is written back, i.e. pushed back, to the home node through messages RspIWb(X) and WbIData(X=1), instead of providing the data directly to partial read requestor agent A as in FIG. 4a.

A similar protocol flow to FIG. 4a then continues with a conflict phase. However, note that when the NonSnpRd(X), i.e. non-snoop read, is requested by the I/O hub, the valid data of X=1 has already been written back to memory, even with the delay of RspI(X) occurring after the non-snoop read. Therefore, in this embodiment, the use of a Snoop Invalidate No Forward message instead of the Snoop Invalidate Own Message for the partial read results in correction of the aforementioned potential problems. In other words, in response to the Snoop Invalidate No Forward message for the partial read, the data is not forwarded directly to the partial read requestor and the write back of modified data occurs before the non-snoop read by the I/O Hub.

Figure 5A:
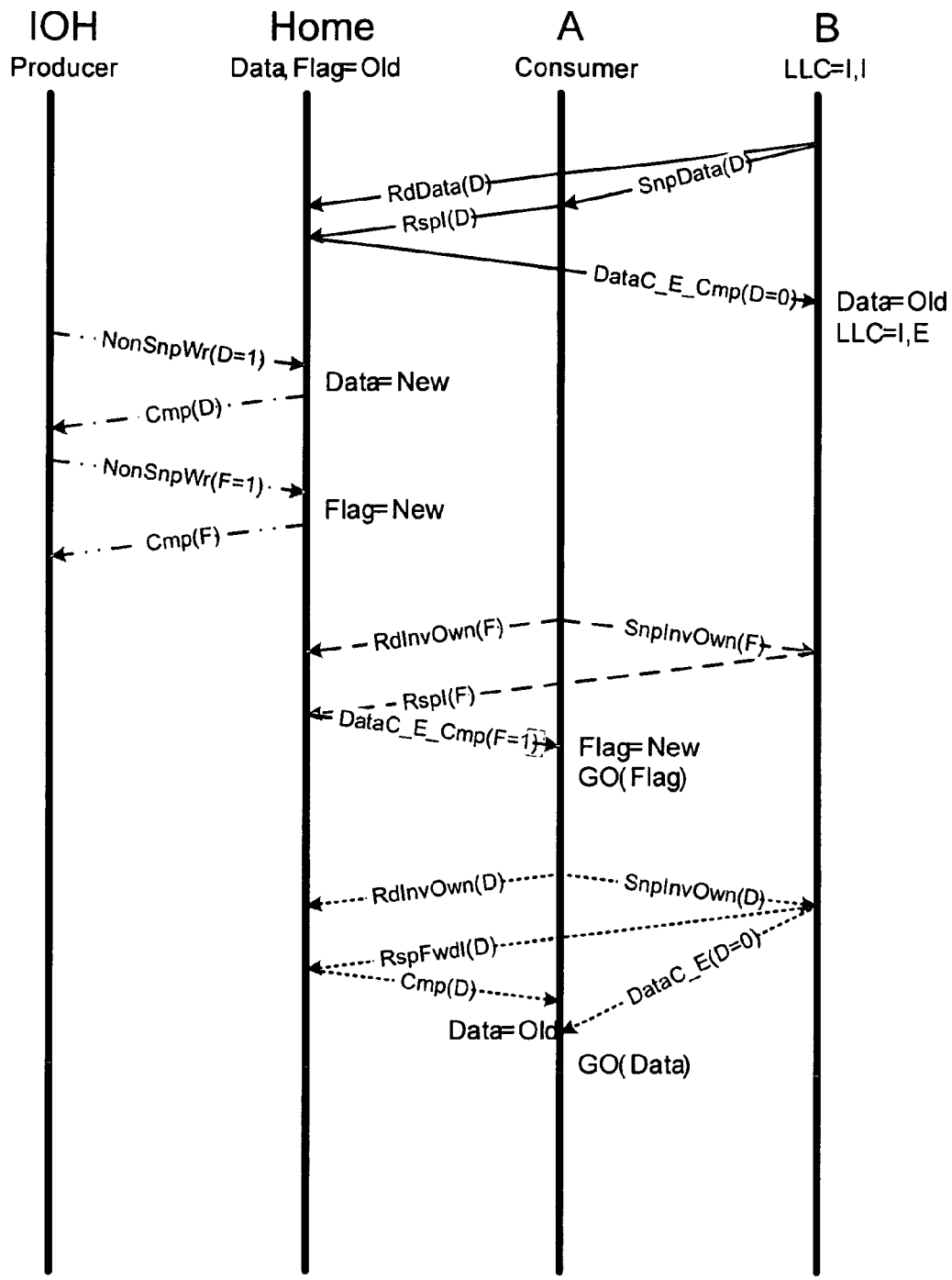
FIG. 5a illustrates another embodiment of a protocol diagram for a messaging protocol between multiple nodes that potentially results in an access to invalid data.

Turning to FIG. 5a, an embodiment of a protocol diagram for a different scenario that potentially results in a memory ordering violation is illustrated. The protocol illustrated in FIG. 5a is in response to the following exemplary interaction pattern:

IOH: Data=New; Flag=New; //NS Wrs to Data & flag
A: If(Flag==New) assert (Data==New); //Partial Rds of data & flag
B: Read Data==Old; //cacheable read of Data First, agent B initiates a cache coherent read transaction of Data. RdData and SnpData messages are transmitted to the home node and peer agent A. Peer node A responds to the home node with a RspI to indicate that a cache line associated with Data is left in an Invalid state. Consequently, the home node provides a DataC_E_Cmp message to agent B, which transitions the cache line to an Exclusive state with data equal to zero, i.e. old. Furthermore, the I/O hub, or producer, initiates non-snoop write transactions with the Home, which results in Data and Flag each being updated to New, i.e. a value of 1.

Consumer agent A then initiates partial read transactions of Flag and Data. However, when peer agent B receives the SnpInvOwn(D), agent B holds the cache line associated with Data in an Exclusive state. As a result, peer agent B provides its cached copy of data, i.e. Data equal to Old, and a RspFwdI message to the home node. Unfortunately, instead of fetching the latest copy of Data that the producer, I/O Hub, deposited in memory, A's read of Data causes a stale copy in B's cache to be forwarded to A, even though A's read of Flag does get the latest copy from memory.

As an example, assume I/O Hub is performing the non-snoop writes on behalf of an I/O device communicating with processor A. Ideally, processor A checks the Flag to see when new data has arrived, which allows the processor to perform other operations until the data is ready to be manipulated. However, in the illustrated set of conditions, processor A reads the Flag as new to indicate new data has arrived, and potentially operates on invalid/old data believing it to be new data based on the new flag value. Consequently, this memory ordering violation potentially results in invalid execution.

Figure 5B:
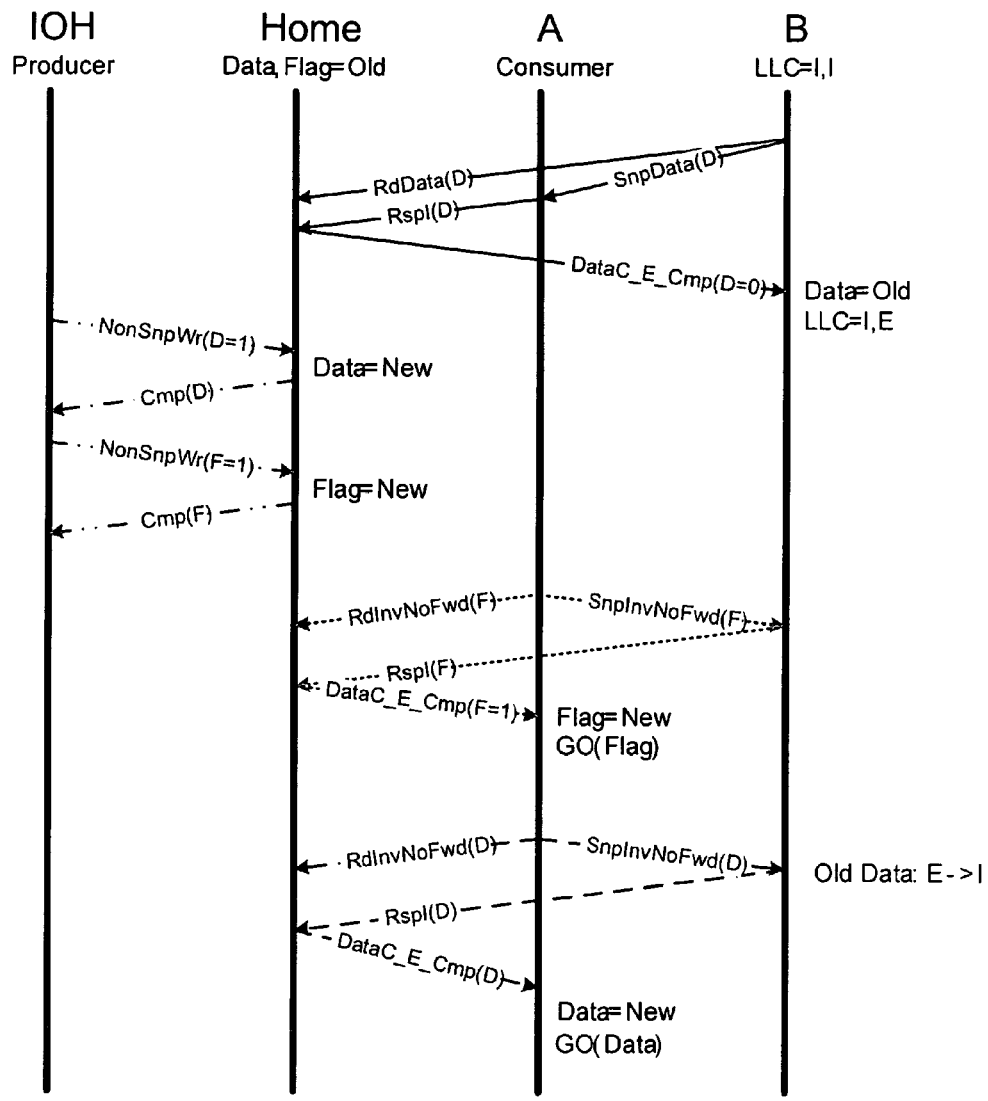
FIG. 5b illustrates another embodiment of a protocol diagram for providing valid data in response to partial and non-snoop memory accesses.

Turning to FIG. 5b, an embodiment of a protocol diagram for providing proper memory ordering for the aforementioned interaction pattern is illustrated. Here, the original coherent read transaction is performed with request, response, and completion phases. Similarly, the non-snoop writes from a non-caching agent are performed to update Data and Flag. However, for the partial reads of Flag and Data, Read Invalidate No Forward and Snoop Invalidate No Forward messages are utilized. As a result, peer agent B, in both cases does not forward data directly to consumer/partial read requesting agent A. Instead, with Data held in the Exclusive state, in this embodiment, a RspI is transmitted to the home node and the cache line is transition to an Invalid state. Moreover, the home node provides the correct Data, i.e. Data=New, which was deposited by the I/O Hub producer.

Therefore, as can be seen from above, memory ordering violations resulting from partial reads and non-coherent memory accesses are avoided through use of protocol messages for the partial reads to have peer agents invalidate and not forward their cached copies. A few illustrative examples of memory ordering violations and how they are correctable are discussed above. Yet, potentially many more interaction patterns between partial accesses and non-coherent accesses are correctable through use of such messages. Furthermore, implementation of these protocol messages, in one embodiment, within protocol logic potentially results in reduced risk of legacy software causing memory ordering violations, reduces the burden on software programmers to adhere to software constraints to enforce memory ordering, and enables new hardware and software usage models.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc... For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. An apparatus comprising:
a receiver to receive a snoop invalidate message, wherein the snoop invalidate message corresponds to a particular cache line; and
cache protocol logic to generate a writeback message in response to the snoop invalidate message, wherein the writeback message is to indicate a write to a home agent associated with the particular cache line and cause a transition of the particular cache line from a modified cache coherency state to an invalid cache coherency state, the snoop invalidate message comprises a snoop invalidate invalid to exclusive (SnpInvItoE) message, and the SnpInvItoE is to flush any modified state data to the home agent.

2. The apparatus of claim 1, wherein the writeback message is to comprise a writeback modified to invalidate (WbMtoI) message.

3. The apparatus of claim 1, wherein the snoop invalidate message corresponds to a partial read of the particular cache line.

4. The apparatus of claim 3, wherein the partial read of the particular cache line is generated by another agent.

5. The apparatus of claim 3, wherein the partial read is to comprise a read invalidate own (RdInvOwn) message.

6. The apparatus of claim 3, wherein the partial read is to result in invalidation of all copies of the particular cache line.

7. The apparatus of claim 3, wherein the partial read is to be sent to the home agent.

8. An apparatus comprising:
a home agent to:
receive a read invalidate message from a first coherency agent, wherein the read invalidate message corresponds to a particular cache line, a snoop invalidate message is to be sent to correspond with the read invalidate message, the snoop invalidate message comprises a snoop invalidate invalid to exclusive (SnpInvItoE);
receive a writeback message from a second coherency agent in response to the snoop invalidate message, wherein the writeback message is to cause a transition of the particular cache line from a modified cache coherency state to an invalid cache coherency state; and
perform a write to the particular cache line based on the writeback message.

9. The apparatus of claim 8, wherein the read invalidate message comprises a read invalidate own (RdInvOwn) message.

10. The apparatus of claim 9, wherein the RdInvOwn message requests data in a modified (M) state.

11. The apparatus of claim 9, wherein the RdInvOwn message requests data in a executive (E) state.

12. The apparatus of claim 8, wherein the home agent is further to manage conflicts between involving the particular cache line.

13. The apparatus of claim 12, wherein the home agent is to manage a particular conflict involving the particular cache line based on receipt of a conflict acknowledgement message.

14. The apparatus of claim 8, wherein the writeback message is to comprise a writeback modified to invalidate (WbMtoI) message.

15. The apparatus of claim 8, wherein the snoop invalidate message corresponds to a partial read of the cache line.

16. An apparatus comprising:
a cache coherency agent to:
receive a snoop invalidate invalid to exclusive (SnpInvItoE) message, wherein the SnpInvItoE message corresponds to a partial read of a particular cache line by another cache coherency agent and is to flush any modified state data related to the particular cache line to a home agent, and the partial read is to comprise a read invalidate own (RdInvOwn) message; and
generate a writeback modified to invalidate (WbMtoI) message in response to the snoop invalidate message, wherein the WbMtoI message is to indicate a writeback of invalid data (WbIData) to the home agent and is to cause a transition of the particular cache line from a modified cache coherency state to an invalid cache coherency state.

* * * * *